March 14, 1944.  E. C. YOW  2,344,478
APPARATUS FOR SHARPENING SAWS
Filed Aug. 27, 1943  2 Sheets-Sheet 1
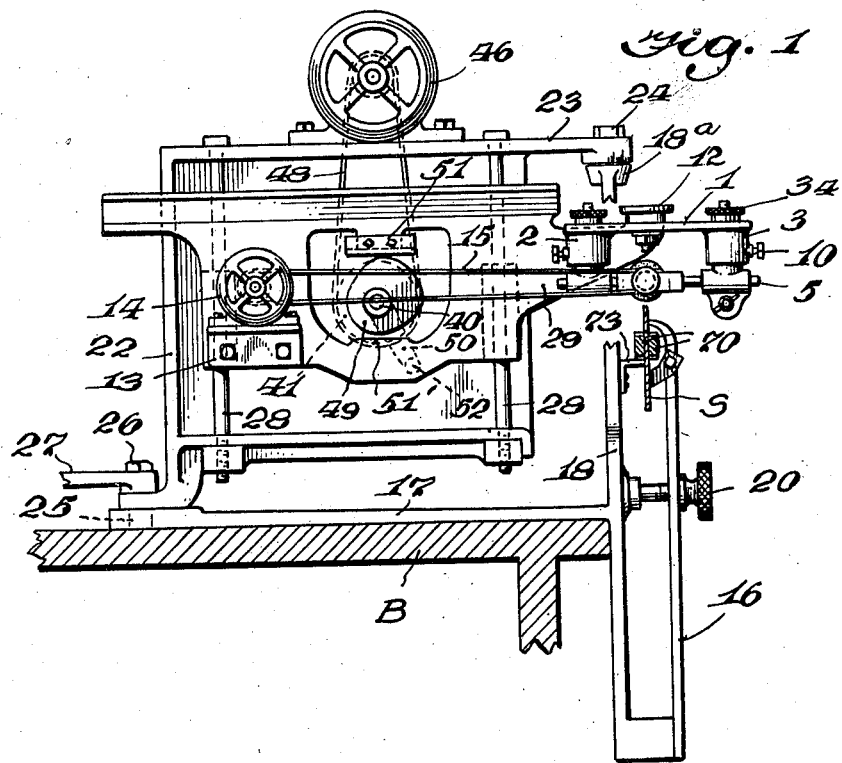
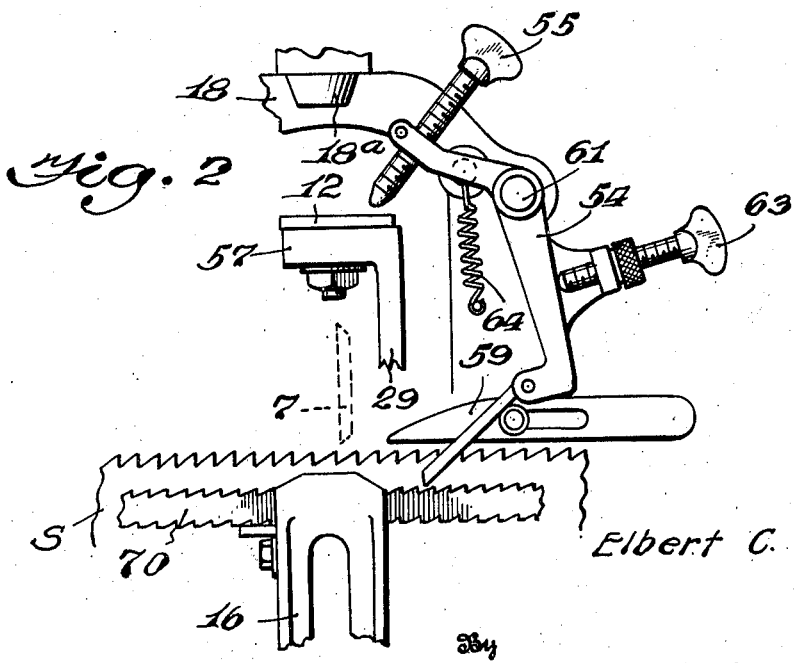
Inventor
Elbert C. Yow,
By
Milford Schwartz Attorney March 14, 1944.  E. C. YOW  2,344,478
APPARATUS FOR SHARPENING SAWS
Filed Aug. 27, 1943   2 Sheets-Sheet 2

Inventor
Elbert C. Yow,
By Wilford Schwartz, Attorney

Patented Mar. 14, 1944

2,344,478

UNITED STATES PATENT OFFICE 2,344,478

APPARATUS FOR SHARPENING SAWS

Elbert C. Yow, Washington, D. C.

Application August 27, 1943, Serial No. 500,251

9 Claims. (Cl. 76—37)

This invention relates to a sharpening or grinding apparatus for saws and more particularly to an adapter for attachment to a saw sharpening machine of the reciprocating tool type.

It is the object of the present invention to provide an adapter embodying a rotary grinding tool which may be interchanged conveniently with a reciprocating file on a machine for sharpening the teeth of saws of all types.

It is another object of the invention to provide a replacement unit of simple and economical construction permitting the use of rotary grinding wheels on saw grinding machines which may be attached expeditiously to standard machines to enable a more rapid sharpening operation to be executed.

It is a further object of the invention to substitute a rotary grinding wheel of carborundum or other abradant material for the purpose of sharpening the teeth of all types of saws such as band saws, hack saws, meat saws, carpenters' saws, circular saws and the like, for conventional three-sided files executing a reciprocating movement in the course of sharpening of such saws, while use is made of the same indexing or teeth-advancing means for intermittently advancing the saw undergoing sharpening, which are normally incorporated in the machine embodying said files.

It is a further object of the invention to provide a rotary grinding wheel upon an adapter which may be conveniently attached to and detached from an existing machine while enabling a rapid adjustment of the grinding wheel to be made to control the extent and direction of the movement of the grinding wheel with respect to the saw being sharpened.

It is the object of the present invention to make possible the utilization of existing machines for the sharpening of saws which are designed to use three-sided files formed of critical metal alloys which are no longer available in the quantities required in view of the shortage of such critical materials on account of war conditions. These idle machines are rendered fully operative to sharpen saws at a more rapid rate than by the use of the metallic files by the provision of an adapter in accordance with the present invention employing grinding wheels which are plentiful and which may be conveniently interchanged upon the adapter as they wear out.

Other objects and purposes will appear from the detailed description of the invention following hereinafter, taken in conjunction with the accompanying drawings, wherein Fig. 1 is a side elevation of the apparatus with certain parts in section;

Fig. 2 is a front view of the apparatus showing the means for successively feeding the teeth of the saw undergoing sharpening into the field of operation of the grinding wheel;

Figure 3:
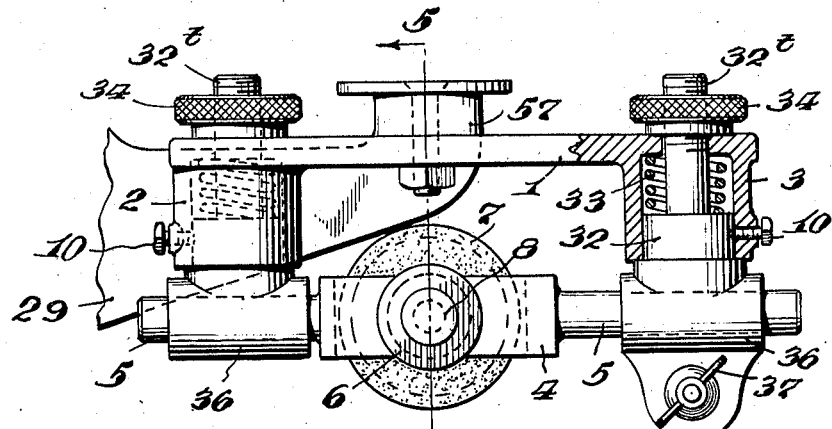
Fig. 3 is an enlarged view of the adapter shown in Fig. 1 with certain parts in section.
Figure 4:
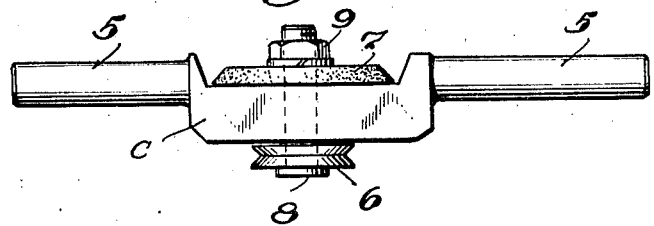
Fig. 4 is a plan view of the sharpening tool carrier.

The adapter in accordance with the present invention is shown applied to a saw filing machine of a type in extensive use, utilizing three-sided metallic files which are given a compound endwise and up and down movement to engage successively the teeth of a saw undergoing sharpening. The Foley saw filers are illustrative of such types of machines and the patents to Foley, Nos. 1,224,293, May 1, 1917, and 1,668,361, May 1, 1928, disclose such machines to which reference may be made for a full disclosure of machines of this type. In the description herein, the elements in common with the machine disclosed in Patent No. 1,668,361, for example, have been given the corresponding reference numerals for facilitating an understanding of the improvement to such machines which is presented by the instant invention.

As shown in Fig. 1, the machine having a horizontal base 17 and a vertical face plate 18 is designed to be clamped upon any suitable bench B. An upright plate 22, operating as a crosshead guide, is pivotally mounted on a vertical axis to the face plate 18 by the provision of the arm 23 at the front end of the upright plate 22 which is pivotally attached by a machine screw or stud 24 to a lug 18a on the upper edge of the face plate 18. An arcuate groove 25 is provided at the rear of the base plate 17 having the axis of bolt 24 as a center which permits the swinging of the plate 22 around the axis to adjust the plane of the crosshead guide 22 with respect to the plane of the saw and consequently the inclination of the plane of the sharpening tool carried by the plate 22 with respect to the plane of the saw, as explained below. A bolt 26 attached to the plate 22 extends through slot 25 and may be clamped at any desired position by the lever 27. This adjustment is a characteristic of the saw filing machine disclosed in the above-mentioned Foley patents, Nos. 1,224,293 and 1,668,361.

A pair of vertical guide rods 28 are mounted upon the plate 22 in offset relation to the main plane of the plate for the purpose of guiding a secondary crosshead 29 which is constrained to move in a vertical direction by the provision of circular openings or apertures in the secondary crosshead through which pass the guide rods 28. An electric motor 46 may be mounted at the top of the main crosshead guide 22 which is used to drive a pulley 41 through the intermediary of a transmission belt 48 for the purpose of imparting rotary movement to the shaft 40 upon which the pulley is mounted and which additionally carries a cam 49 cooperating with guide surfaces 51 and 51' on the secondary crosshead guide 29 to lift and lower this crosshead guide as the same rotates. If desired, the drive can be executed through a system of gears as shown in Fig. 1 of Patent No. 1,668,361 and which also suggests the use of a manual drive in lieu of the motor operated drive. In view of the fact that the instant invention is not concerned with the details of the drive, these variations are not illustrated herein.

Heretofore, the machines utilizing a reciprocating three-sided file were provided with an additional slide carried in the horizontally extending guide or guides of crosshead 29, which slide was operated by the provision of a crank arm 50 (shown in dotted lines) having a roller 52 at the end thereof for the purpose of engaging a vertical slot in the last-mentioned slide to reciprocate the same in a horizontal direction in the guide 29 as the crank arm executed the rotary movements imparted thereto by the shaft 40. Heretofore the file has been mounted in a carrier provided in the front end of this reciprocating slide, which slide is removed from the guide 29 for the purpose of attaching the adapter in accordance with the present invention, leaving only the guide 29 experiencing the vertical movements explained above. Preferably the roller 52 is also removed.

An arm 57 is provided at the forward end of the crosshead guide 29 upon which is mounted the washer 12 which controls the indexing or teeth-advancing mechanism as the same experiences its up and down movements, which mechanism is shown generally in Fig. 2.

The bracket 1 in accordance with the present invention is attached to the underside of the offset arm 57 by means of the bolt 11 extending through the top of the washer 12 and is fixed in place by means of the nut 13 and a lock washer. The bracket 1 is provided with two downwardly extending sleeved extensions 2 and 3 which are employed for adjustably mounting the supports for the tool carrier. The tool carrier C is shown formed of cylindrical extensions 5 having an intermediate portion 4 in which is journalled the shaft 8 having the pulley 6 mounted at one end thereof and the grinding tool 7 at the other end thereof maintained in assembled condition by the nut 9 which may be conveniently detached for the purpose of interchanging the grinding wheel 7 for replacement purposes or for varying the nature of the cut to be executed thereby.

Figure 5:
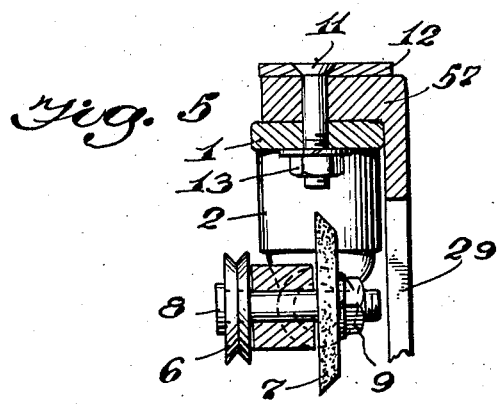
Fig. 5 is a vertical sectional view along 5—5 of Fig. 3, with certain parts in section.

The cylindrical ends 5 of the tool carrier are designed to be mounted in tubular holders 36 which extend transversely to the bolt portions 32 extending upwardly into the sleeved extensions 2 and 3. A spring 33 cooperates with each cylindrical bolt portion 32 to press the holder 36 downwardly against the action of the clamping nut 34 engaging the threaded end 32t of the supporting bolt. A set screw 10 serves to clamp the bolt in adjusted position following the manipulation of the thumb nut 34 and serves to fix the vertical adjustment of the grinding tool. The inclination of the tool around the axis of the cylindrical extensions 5 may also be adjusted by splitting or slotting the tubular holders 36 and by providing wing nuts 37 which may be loosened and tightened to adjust the setting of the tool carrier. Aside from the capability of the carrier being rocked in the tubular holders it may be moved longitudinally to a slight extent within the limitations of the intermediate portion 4 striking against the tubular holders 6. As shown in Figs. 2 and 5, the cutting edge of the grinding wheel 7 is in the plane of bolt 11 and pivot stud 24. Furthermore, the vertical axes of the sleeves 2 and 3 are in the same vertical plane as the axis of bolt 11 and pivot stud 24.

These adjustments, coupled with the one described above in respect to the pivotal movement of the main carrier about the pivot stud 24, enable the tool to assume any desired position.

In view of the fact that the adapter is attached to the vertical reciprocating crosshead guide 29, following the removal of the horizontal reciprocating slide carrying the three-sided files, no changes are necessary in the machinery to attain the intermittent feeding movement of the saw which is controlled by the up and down movement of the secondary cross head guide. As shown in Figs. 1 and 2, the saw S is used in conjunction with clamping bars 70 clamped to the opposing sides of the saw blade parallel to the saw teeth. These bars 70 and 71 are provided with teeth on both edges and these are of different fineness or number per inch so that they can be utilized to correspond to saws having different numbers of teeth per inch, as fully disclosed in the above-mentioned Patent No. 1,668,361. In Fig. 1 a shelf 73 is provided for the innermost bar 70 and the saw is maintained in place by the clamp 16 cooperating with the clamping screw 20.

The feed movement of the saw is automatically produced by the means best shown in Fig. 2. The bell crank lever 54 is pivotally mounted on stud 61 and the upper terminal of the bell crank lever is fitted with the adjustable oblique screw 55 which provides an adjustable contact for cooperation with the washer 12 as the same moves upwardly to impart a rocking movement to the lever 54 and pawl 59 to advance the bar 70 the necessary extent. A stop screw 63 is adjustably mounted in a lug of face-plate 18 for the purpose of limiting the outward or return movement of the bell crank lever 54 which is effected by the spring 64 when the secondary crosshead guide 29 executes its downward movement preparatory to the next successive feeding movement when the guide 29 moves upwardly and strikes screw 55 to rock again lever 54 and the feeding pawl 59 pivotally connected thereto. While the feed mechanism illustrated herein presents a simplification of that shown in the above-mentioned Foley patents, it is understood that any desired type of indexing mechanism may be used in conjunction with the invention which in turn may be applied to any indexing mechanism which is controlled by the up and down movements of the secondary crosshead guide.

The use of the adapter described above makes possible the speeding up of the saw sharpening operation which is effected solely by an up and down movement of the grinding wheel. Thus, while forty teeth per minute may be sharpened with a three-sided reciprocating file, fifty-five to sixty teeth per minute may be sharpened with a grinding wheel adapter as described above.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. An adapter for attachment to a saw sharpening machine of the reciprocating tool type embodying a crosshead adapted to execute vertical movements and an indexing means operated thereby for intermittently advancing the saw, comprising a depending bracket attached to the forward end of said crosshead and provided with sleeved extensions at the front and back thereof extending in a downward direction, a holder adjustably mounted in each of said extensions provided with a bearing extending transversely to the axes of said extensions, said bearings being arranged coaxially with each other, a tool carrier having ends for mounting in said bearings, a rotary grinding wheel rotatably mounted in said tool carrier, and means for rotating said wheel to sharpen the teeth of a saw as said crosshead is brought into engagement therewith.

2. An adapter for attachment to a saw sharpening machine of the reciprocating tool type embodying a crosshead adapted to execute vertical movements and an indexing means operated thereby for intermittently advancing the saw, comprising a depending bracket attached to the forward end of said crosshead and provided with a pair of downwardly extending sleeves, a holder adjustably mounted in each of said sleeves provided with a tubular bearing extending transversely to the axes of said sleeves, said bearings being arranged co-axially with each other and in a line substantially transverse to the plane of the saw, a tool carrier having cylindrical ends for mounting in said bearings, a rotary grinding wheel rotatably mounted in said tool carrier on an axis substantially parallel to the plane of the saw, and means for rotating said wheel to sharpen the teeth of a saw as said crosshead is brought into engagement therewith.

3. An apparatus as set forth in claim 2 wherein said last-mentioned means comprises a driving pulley connected to said grinding wheel, a driving motor mounted on said crosshead and transmission means extending between said motor and pulley.

4. An adapter for attachment to a saw sharpening machine of the reciprocating tool type embodying a crosshead adapted to execute vertical movements, a carrier therefor pivotally mounted at the front end thereof about a vertical axis and an indexing means operated by said crosshead for intermittently advancing the saw, comprising a depending bracket attached to the forward end of said cross head and provided with a pair of downwardly extending sleeves lying in a vertical plane common to said first-mentioned axis, a holder adjustably mounted in each of said sleeves provided with a tubular bearing extending transversely to the axes of said extensions, said bearings being arranged co-axially with each other with the axes thereof lying in said vertical plane, a tool carrier having cylindrical ends for mounting in said bearings, a rotary grinding wheel rotatably mounted in the intermediate portion of said tool carrier on an axis substantially parallel to the plane of the saw, and means for rotating said grinding wheel to sharpen the teeth of a saw as said cross head is brought into engagement therewith.

5. The combination set forth in claim 4 wherein at least the tubular bearing at the front of the machine is split and is provided with clamping means to adjust the inclination of the plane of the grinding wheel from the vertical.

6. The combination set forth in claim 4 wherein at least the tubular bearing at the front of the machine is split and is provided with clamping means to adjust the inclination of the plane of the grinding wheel from the vertical, said grinding wheel having the plane of the principal disc surface thereof normally lying in said vertical plane containing the axes of said sleeves and said tubular bearings.

7. The combination set forth in claim 4 wherein each of said holders terminates in a threaded end extending upwardly through the respective sleeve, a nut engaging said end at the upper surface of the bracket, a spiral spring in said sleeve surrounding said end tending to force said holder outwardly against the action of said nut, and a set screw extending into said sleeve and co-operating with a cylindrical portion of said holder to retain said holder in the adjusted position of the level of the tool carrier supported thereby.

8. An adapter for attachment to a saw sharpening machine of the reciprocating tool type embodying a crosshead adapted to execute vertical movements and an indexing means operated thereby for intermittently advancing the saw, comprising a depending bracket attached to the forward end of said crosshead and provided with sleeved extensions at the front and back thereof extending in a downward direction, a threaded bolt extending upwardly in each of said extensions adapted to cooperate with a nut at the upper surface of said bracket and supported thereby and a sleeved bearing extending normally to the axis of said bolt at the lower end thereof, a tool support having cylindrical ends for mounting in said sleeved bearings, a rotary grinding wheel rotatably mounted in said tool support, and means for rotating said wheel to sharpen the teeth of a saw as said crosshead is brought into the field of operation of the teeth.

9. An apparatus for sharpening saws comprising a crosshead adapted to execute vertical movements, a carrier therefor pivotally mounted at the front end thereof about a vertical axis, indexing means operated by said crosshead for intermittently advancing the saw, an adapter mounted on said crosshead comprising a depending bracket attached to the forward end of said crosshead and provided with a pair of downwardly extending sleeves, a holder adjustably mounted in each of said sleeves provided with a tubular bearing extending transversely to the axes of said sleeves, said bearings being arranged co-axially with each other, a tool carrier having cylindrical ends mounted in said bearings, a rotary grinding wheel rotatably mounted at an intermediate portion of said tool carrier, means for adjusting the longitudinal position of said grinding wheel between said bearings, and means for rotating said grinding wheel to sharpen the teeth of a saw as said crosshead is brought into engagement therewith.

ELBERT C. YOW.